United States Patent
Smith et al.

(10) Patent No.: US 12,235,858 B1
(45) Date of Patent: Feb. 25, 2025

(54) GRAPHICAL USER INTERFACE FOR A MATCHING TOOL

(71) Applicant: Intuit Inc., Mountain View, CA (US)

(72) Inventors: Samuel Austin Smith, Roanoke, TX (US); Vivek Srinivasan, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 5 days.

(21) Appl. No.: 18/362,899

(22) Filed: Jul. 31, 2023

(51) Int. Cl.
*G06F 16/248* (2019.01)
*G06F 16/2457* (2019.01)
*G06F 16/28* (2019.01)

(52) U.S. Cl.
CPC ...... *G06F 16/248* (2019.01); *G06F 16/24578* (2019.01); *G06F 16/287* (2019.01)

(58) Field of Classification Search
CPC ... G06F 16/24578; G06F 16/248; G06F 3/048
See application file for complete search history.

(56) References Cited

U.S. PATENT DOCUMENTS

| | | | | |
|---|---|---|---|---|
| 9,015,163 B1* | 4/2015 | Skolicki | ............ | G06F 16/24558 707/758 |
| 10,936,665 B2* | 3/2021 | Dupey | ................. | G06F 16/215 |
| 11,409,777 B2* | 8/2022 | Roberts | ............. | G06F 16/24578 |
| 2014/0244300 A1* | 8/2014 | Bess | ....................... | G06F 16/22 705/3 |
| 2015/0286713 A1* | 10/2015 | Zhang | .................. | G06F 16/367 707/749 |
| 2017/0039553 A1* | 2/2017 | Ghatage | ............. | G06Q 20/3563 |
| 2020/0081904 A1* | 3/2020 | Flynn | .................... | G06F 16/284 |

FOREIGN PATENT DOCUMENTS

| EP | 2187327 A1 * | 5/2010 | ........... G06F 19/366 |
|---|---|---|---|
| WO | WO-2020191355 A1 * | 9/2020 | ......... G06F 16/9024 |

* cited by examiner

*Primary Examiner* — Etienne P Leroux
*Assistant Examiner* — J Mitchell Curran
(74) *Attorney, Agent, or Firm* — Lathrop GPM LLP

(57) ABSTRACT

A method includes obtaining matches between target records in a target dataset and a reference records in a reference dataset, each match of the matches comprising a corresponding confidence level of the match, categorizing the target records into review level categories according to the corresponding confidence level, and presenting a graphical user interface (GUI). The GUI includes a first section for a first review level category showing a first subset of the target records assigned to the first review level category, the first subset comprising target records related, in the GUI, to at least one matching reference record. The GUI includes a second section for a second review level category, wherein the second section shows a second subset of the target records assigned to the second review level category, the second subset comprising target records related, in the GUI, to at least one matching reference record.

18 Claims, 9 Drawing Sheets

GRAPHICAL USER INTERFACE FOR A MATCHING TOOL

BACKGROUND

Computer systems have the ability to generate and manage a vast amount of data. Often users will use a variety of software applications that each generate and/or manage such data. When using multiple software applications, the same item (e.g., representative of a thing, person, business, etc.) may be represented multiple times in different records. For example, one software application may have its own record of an item that is different from the record used by a second software application for the same item. When the records for the same item are not linked, more storage capacity is needed, updates may not be propagated or may take more time resulting in incorrect data being used. Thus, the lack of linkage between stored records of the same item is a problem with data integrity.

However, with the amount of data that computers store, a user cannot determine by themselves which records match. Conversely, when the records for the same entity do not match exactly, computer systems often are inaccurate in matching records of the same entity. Thus, systems that combine computer match determination with a user interface for a user to validate the matches may be used. However, current user interfaces for validating matches are crowded and cumbersome to users. Such user interfaces do not properly focus the user's attention on the important aspects for validating matches. Because of the volume of data and the amount of validation through the user interface, users may abandon attempts to validate matches or quickly accept incorrect matches causing data integrity problems in the computer system.

SUMMARY

In general, in one aspect, one or more embodiments relate to a method that includes obtaining matches between target records in a target dataset and a reference records in a reference dataset, each match of the matches including a corresponding confidence level of the match, categorizing the target records into review level categories according to the corresponding confidence level, and presenting a graphical user interface (GUI) with the target records organized according to the review level categories. The GUI includes a first section for a first review level category of the review level categories, wherein the first section shows a first subset of the target records assigned to the first review level category, the first subset including target records related, in the GUI, to at least one matching reference record of the reference records as defined by the matches, and a second section for a second review level category of, wherein the second section shows a second subset of the target records assigned to the second review level category, the second subset including target records related, in the GUI, to at least one matching reference record as defined by the matches.

In general, in one aspect, one or more embodiments relate to a non-transitory computer readable medium including a computer readable program code for a graphical user interface including target records organized according to review level categories, the target records in a target dataset matched by matches to reference records in a reference dataset, each match of the matches including a corresponding confidence level of the match, wherein the target records are categorized into the review level categories according to the corresponding confidence level. The graphical user interface (GUI) includes a first section for a first review level category of the review level categories, wherein the first section shows a first subset of the target records assigned to the first review level category, the first subset including target records related, in the GUI, to at least one matching reference record of the reference records as defined by the matches. The GUI further includes a second section for a second review level category of the review level categories, wherein the second section shows a second subset of the target records assigned to the second review level category, the second subset including target records related, in the GUI, to at least one matching reference record of the reference records as defined by the matches.

In general, in one aspect, one or more embodiments relate to a method including executing a top matching model on a target dataset and a reference dataset to obtain top matches for a target dataset, each match of the top matches including a corresponding top match confidence level of the match, populating a first section of a graphical user interface with a first subset of the plurality top matches that have the corresponding top match confidence level greater than a confidence threshold, and executing a rank matching model on the target dataset and the reference dataset to obtain possible matches for the target dataset, each match of the possible matches including a corresponding possible match confidence level of the match. The method further includes populating a second section of the graphical user interface with a second subset of the possible matches when a target record have the corresponding possible match confidence level less than the confidence threshold.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to a graphical user interface (GUI) for a matching tool. A matching tool is a tool that may be used by users to identify matches between records. Matching records are records that are for the same item. For example, the matching records may include data describing the same person, physical thing, business, or other item. The matching tool determines which records match and a confidence level of the match. The matching tool includes a corresponding GUI for the user to validate the matches.

The GUI for the matching tool is specifically designed and presented to focus a user's attention on the portions of the GUI having the set of matches which should be reviewed more carefully in one or more embodiments. For example, matches are organized to be in separate sections depending on the review level categories assigned to the matches. The review level category assigned to a match is based on the confidence level of the match. Additional aspects of the GUI further simplify the user's review of the match. For example, in one or more embodiments, matching records are presented in table format. The order of columns of the table are based on the degree of importance in matching the records. As another example, differences between matching records may be demarcated in the user interface. Other aspects of the GUI are described below and in the Figures.

Figure 1:
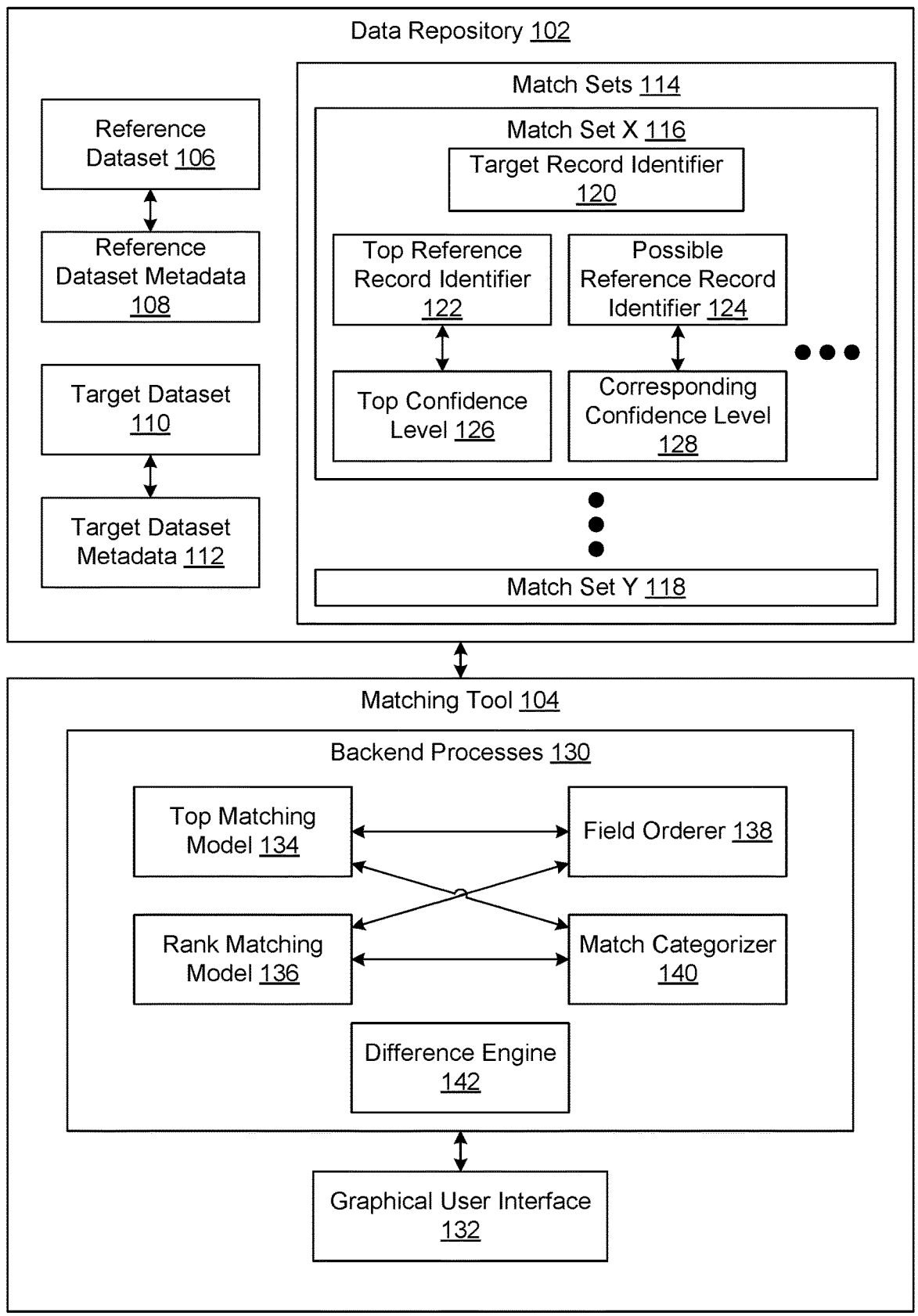
FIG. 1 is a diagram of a system in accordance with one or more embodiments.

Turning to the Figures, FIG. 1 shows a diagram of a system that includes a data repository (102) connected to the matching tool (104). Both of these components are described below.

The data repository (102) is any type of storage unit and/or device (e.g., a file system, database, data structure, or any other storage mechanism) for storing data. Further, the data repository (102) may include multiple different, potentially heterogeneous, storage units and/or devices. The data stored by the data repository includes a reference dataset (106) with reference dataset metadata (108) and a target dataset (110) with target dataset metadata (112). Each dataset (e.g., reference dataset (106), target dataset (110)) is data in a storage structure with corresponding data. Any storage structure for storing data may be used. For example, the storage structure may be comma separated value, database, spreadsheet, or other storage structure. The data in the dataset is partitioned into records. Each record is for a particular item and includes field values for fields. A field value is the value of the field and describes an individual attribute or property of an item. Thus, a field value is a discrete unit of data that may be compared to determine whether the corresponding record matches having the field value matches another record. Each record in the respective dataset includes a record identifier. The record identifier is a unique identifier of the record. For example, the record identifier may be a combination of one or more field values that uniquely identify the record amongst the other records in the dataset.

The dataset metadata (e.g., reference dataset metadata (108), target dataset metadata (112)) is information describing the respective datasets. For example, the metadata may include the name and order of the fields of each record, the datatypes of the fields, timestamps associated with individual records and the datasets, and other information.

The datasets include a reference dataset (106) and a target dataset (110). The target dataset (110) is the dataset having records for which matches are attempting to be found. The reference dataset (106) is the dataset having the records that are being compared against. For example, the matching tool (104) may search for matches for each record in the target dataset (110) by identifying a matching record in the reference dataset (106). Records in the target dataset are referred to as target records, and records in the reference dataset are referred to as reference records. The target dataset (110) and reference dataset (106) may have the same or heterogeneous storage structures. In some cases, the target dataset (110) and the reference dataset (106) are the same dataset. In such a case, the matching tool (104) is searching for duplications in the same dataset.

In one or more embodiments, the data repository (102) further includes functionality to store match sets (114). Match sets (114) are information about matches found by the matching tool. In one or more embodiments, an individual match set (e.g., match set X (116), match set Y (118)) is for a particular target record identified by the target record identifier (120) in the match set. The match set is the set of one or more matches for a corresponding target record, whereby each match is between the corresponding target record and a reference record.

In the data repository (102), target record identifier (120) is related to one or more reference record identifiers (e.g., top reference record identifier (122), possible reference record identifier (124)). The reference record identifiers are the unique identifiers of the reference records in the reference dataset (106) that are matches for the target record identified by the target record identifier. The top reference record identifier (122) is the reference record identifier of the reference record that is determined to most likely match by the matching tool (104). The possible reference record identifier (124) are other reference record identifiers that are deemed to potentially match but are determined to be less likely to match than the top reference record (122).

Each match, and correspondingly, each reference record identifier in a match set, has a corresponding confidence level (e.g., top confidence level (126), corresponding confidence level (128)). The confidence level is a value identifying the probability that the match is correct (i.e., the probability that the reference record is for the same item as the target record). The top confidence level (126) is for the top reference record identifier (122). The possible reference records in a match set also has a corresponding confidence level (128). Because the top reference record identifier has the greater probability of being correct, the top confidence level (126) is greater than the corresponding confidence level (128) of the possible reference record identifiers (124). In one or more embodiments, a minimum confidence level threshold exists by which a reference record is determined not to match if the corresponding confidence level is less than the minimum confidence level threshold.

Continuing with FIG. 1, the matching tool (104) is a tool to identify match sets and validate matches of records in the target dataset. The matching tool (104) may be a standalone application, part of another application, a service connected to one or more applications, or another type of software. The matching tool (104) includes backend processes (130) and a GUI (132). The backend processes (130) are the processes that determine matches and perform the backend processing for the GUI. The backend processes (130) include one or more matching models (e.g., a top matching model (134), a rank matching model (136)), a field orderer (138), a match categorizer (140), and a difference engine (142).

A matching model (e.g., a top matching model (134), a rank matching model (136)) is a machine learning model that is configured to determine, for each target record in the target dataset, one or more reference records in a reference dataset. Specifically, in one or more embodiments, the one or more matching models are configured to generate a match set. In some cases, the matching model may allow for the same reference record to be matched to multiple target records. In other cases, the matching model may enforce a one-to-one matching between target records and reference records.

The matching model(s) are configured to output a reference record identifier, which may be the same as the reference record identifier in the data repository or may be mapped to the corresponding reference record identifier in the data repository. Additionally, for each match, the matching model(s) may also output the confidence level of the match specifying the degree of probability that match is correct. The matching model(s) may also specify a feature order.

The feature order is the prominence of each feature in identifying the match. Specifically, in machine learning, certain features have greater weight in selecting a match. The features are the properties of the records. The properties may be the field values themselves, values calculated from one or more field values of the records, information from metadata about the records, or other latent or explicit property of the records. The matching model may output the feature order on a per target record basis, across multiple target records, or on a per match basis.

A single matching model may be used that generates the match set. In such a scenario, the single matching model outputs, for each match having a confidence level greater than the minimum confidence level threshold, the reference record identifier and the confidence level of the match.

In some embodiments, such as shown in FIG. 1, multiple matching models may be used. The multiple matching models may be a top matching model (134) and a rank matching model (136). A top matching model (134) is a machine learning model configured to determine a top reference record that matches the target record. Specifically, the top matching model (134) determines the most likely match to the particular target record. An example of a top matching model is a Hungarian matching algorithm. The Hungarian matching algorithm, also called the Kuhn-Munkres algorithm may be used to find maximum-weight matchings in bipartite graphs, whereby one side of a complete bipartite graph is the target record, and the other side is the reference record.

A rank matching model (136) is a machine learning model configured to determine a ranked list of matching reference records that matches the target record. Specifically, the rank matching model (136) determines possible reference records that match and corresponding confidence levels. An example of a rank matching model is a random forest, decision tree, or other fuzzy matching algorithm. For each match, the rank matching model outputs the possible reference record identifier and corresponding confidence level. For each target record, the rank matching model may output each match having a confidence level greater than a minimum confidence level and/or the matches having the highest confidence level up to a predefined number of matches (e.g., output ten matches having the highest confidence levels).

The field orderer (138) is configured to determine a field order for a target record. The field order is the order of fields of a target record based on the prominence of the field in determining the matches for the target record. The field orderer (138) is configured to map features in the feature order to fields of the records to determine the field order. In some cases, the mapping is direct (i.e., the feature is the field). In such case, the field has the same ranking in the field order as the corresponding feature in the feature order. In other cases, the mapping is indirect (e.g., the feature is a calculated value or otherwise determined from one or more fields). Each field from which a feature is determined is mapped to the feature. In the indirect case, the one or more fields that are mapped to the feature are each assigned the same rank in the field order as the corresponding feature in the feature order. If the same field is mapped to multiple features, then the field may be the same as the highest ranked feature to which the field is mapped. The mappings between fields and features may be provided to the field orderer, such as from a configuration file, the matching models, or another software component that extracts features from the records and has the mappings.

The match categorizer (140) is configured to categorize match sets into review level categories based on the corresponding confidence levels of the match and one or more confidence thresholds. The review level category assigned to a match set defines the recommend amount of review for the match set. The recommended amount of review is a guideline for review as compared to other review level categories. Specifically, the actual amount of time that the user spends may be use and/or user specific. However, the review level category provides a guideline for how long or how much attention that the user should give in the review based on the confidence level(s) of the match set. In other words, the review level category is defined relative to other possible review level categories rather than absolute amounts. For example, the recommended review level category may be review quickly category, review carefully category, and optionally other level of review categories.

A confidence threshold is a threshold on the confidence level that separates one review level category from another review level category. For example, a high confidence threshold may separate the review quickly category from other review level categories. Different ways may be used to define the confidence thresholds. In a first way, the confidence threshold is applied only to the top match confidence level. If the top match confidence level is greater than (or equal to) the threshold, then the match set is in the highest review level category (e.g., recommending a cursory review). Otherwise, the match set is assigned to the next review level category.

In another way, the confidence level is a threshold on a value calculated from multiple corresponding confidence levels of the matches in the match set. For example, the confidence threshold may be dependent on the distribution of two or more confidence levels of matches in the match set. By way of a more specific example, if the difference between confidence levels of the highest two matches are greater the confidence threshold to each other, then the match set may be assigned to the highest review level category. Otherwise, in the more specific example, the match set may be assigned to the lower review level category.

Multiple confidence thresholds may be defined. For example, a first confidence threshold may separate a high review level category from a middle review level category, and a second confidence threshold may separate the middle review level category from a low review level category (e.g., for the most careful review or recommending user search for a match).

The difference engine (142) is configured to output differences between the field values of the target record and the reference record on a per match basis. Specifically, for each match, the difference engine (142) determines and outputs the difference between the field values of each field of the target record as compared to the reference record. The difference is specified as which part of the reference record is different from the target record in one or more embodiments. The difference that is output is dependent on the datatype of the field (e.g., as specified in the metadata). For example, if the datatype is a string, the difference is specified as to which characters of the string are added, deleted, or changed as specified on word level or character level. As another example, if the datatype is a numeric value (e.g., number, monetary value, etc.), the difference may be a calculated difference determined by subtracting the field value of the reference record from the field value of the target record. As another example, if the datatype is a geographic location, the difference may be a distance between geographic locations specified in the corresponding field values.

Figure 2:
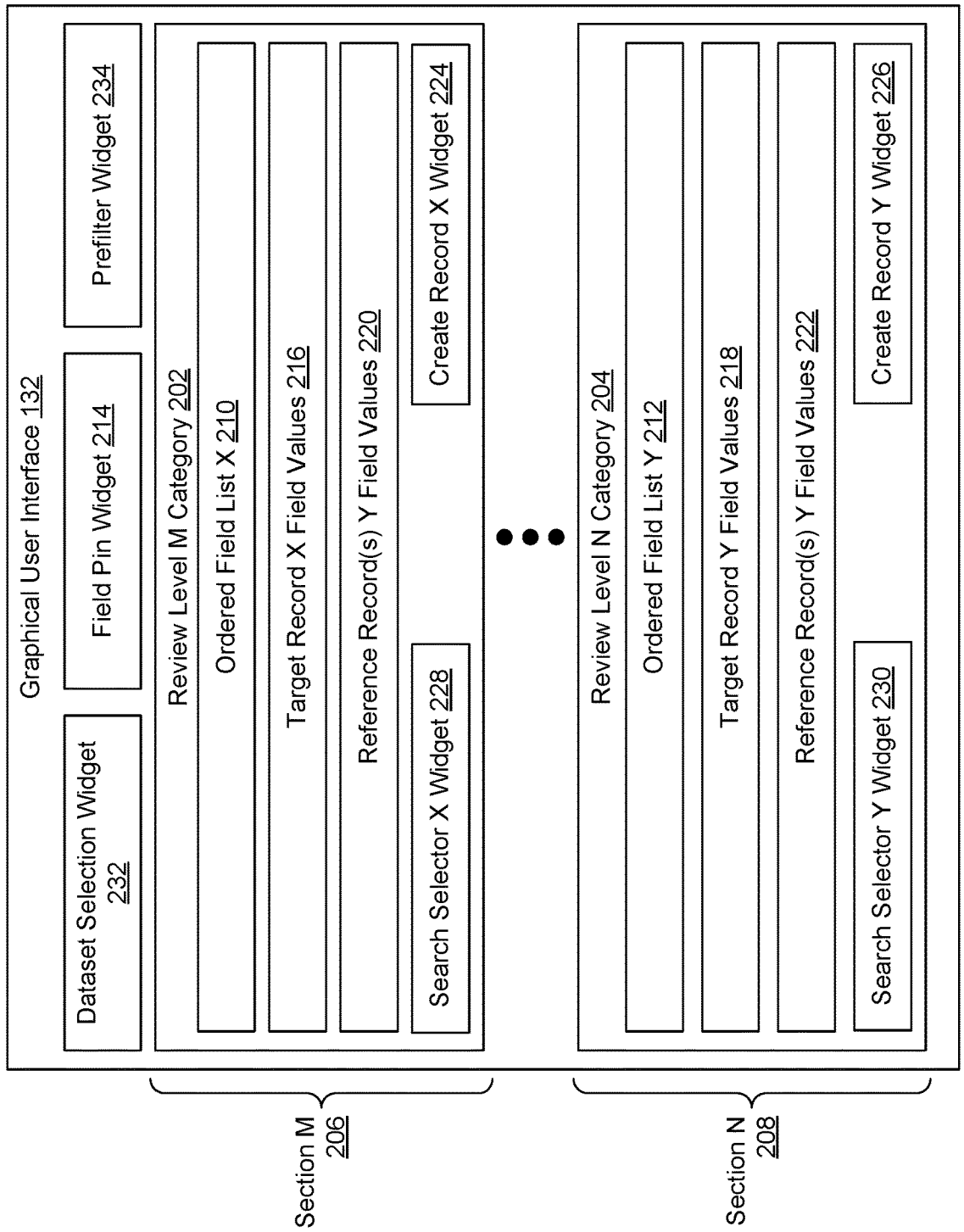
FIG. 2 is a diagram of a graphical user interface (GUI) in accordance with one or more embodiments.

Continuing with the matching tool (104), the matching tool (104) includes the GUI (132). The GUI (132) provides a simplified version of matches into review level categories. FIG. 2 shows a schematic diagram of the GUI (132) in accordance with one or more embodiments.

As shown in FIG. 2, the GUI (132) separates matches into different sections (e.g., section M (206), section N (208)) for different review level categories (e.g., review level M category (202), review level N category (204)). Each section (e.g., section M (206), section N (208)) shows the match sets assigned to the section. Sections (e.g., section M (206), section N (208)) are non-overlapping. In particular, the match sets assigned to one review level category are not intermixed with matches assigned to another review level category in the GUI (132). Sections (e.g., section M (206), section N (208)) in the GUI may be expandable and collapsible. Specifically, collapsing the section minimizes the section and causes the match sets assigned to the section to be hidden. The result of collapsing the section is a decluttered user interface so as to simplify the user's review. Expanding the section shows the match sets assigned to the section. In some embodiments, the match sets in a section may be divided into pages or are scrollable so as to show only a portion of the match sets at a time.

FIG. 2 shows the sections expanded with one match set in each section. When the GUI is being presented to the user, any number (e.g., zero, one, two, etc.) of match sets may appear in any section. When presenting a match set, the ordered field list (e.g., ordered field list X (210), ordered field list Y (212)) shows the field identifiers (e.g., field names) of fields in order specified by the field order while accounting for pinned fields (described below). The ordered field list may be different between sections as different review level categories may have different field orders. Moreover, in cases in which the feature order and, correspondingly, the field order varies amongst match sets assigned to the same review level category, the ordered field list may vary amongst the review level categories.

Some of the fields in the ordered field list may be pinned fields. Pinned fields are fields that the user selects using the field pin widget (214) to be displayed before other fields in the ordered field list. Specifically, the pinned fields are the fields that the user selects to display out of order from the order specified by the field order. The pinned fields may be selected using a field pin widget (214). The field pin widget (214) is a graphical user interface widget that presents the field identifiers and is configured to receive a user selection of the field identifiers. For example, the field pin widget (214) may be a selectable button for each field or a checkbox for each field or another widget.

Continuing with the sections, for each match set, the section shows the target record field values (e.g., target record X field values (216), target record Y field values (218)) and reference record(s) (e.g., reference record(s) X field values (220), reference record Y field values (222)) ordered according to the corresponding ordered field list. The target record field values show the field values of the target record in the match set. The reference record field values show the field values of the reference records. The references record field values may be shown with the differences from the corresponding target records demarcated. The demarcation may be through highlighting, underlining, displaying in a different font color or other formatting change or otherwise demarcating, the particular characters or words that are different. For numerical or geographical fields, the demarcation may be to show the original field value unmarked, and the difference displayed adjacent to the original field value. Because records may have fields of varying datatypes, multiple ways of demarcating the differences may be used.

In different sections, the manner of displaying reference records and demarcating the differences may vary. For example, for the highest review level category recommending the shortest review, only the top reference record may be displayed, and the top reference record may be preselected. As another example, for the highest review level category recommending the shortest review, only the two most likely reference records may be displayed with the top reference record preselected. Continuing with the examples, for a review level category suggesting a more careful review than the top review level category, at least a subset of three or more reference records in the match set may be shown with the top reference record optionally preselected.

In some embodiments, the match sets are displayed in the sections as individual tables. The rows of the tables may be the ordered field list, target record, and reference records. The columns of the tables may be the field identifiers or field values. The use of rows and columns herein is used to denote one axis positioning as compared to the other axis. The row may be horizontally or vertically aligned while the column is on the orthogonal axis to the row without departing from the scope of the claims.

Continuing with FIG. 2, the match set is also shown with a create record widget (e.g., create record X widget (224), create record Y widget (226)). The create record widget is a GUI widget that, upon selection, triggers the creation of a new record in the reference dataset for the target record. Specifically, the create record widget may be used when the user determines that no match is found in the reference dataset. Therefore, a new record should be created. The create record widget may be a GUI button.

The search selector widget (e.g., search selector X widget (228), search selector Y widget (230)) is a graphical user interface widget for the user to submit a query for target records to the reference dataset. For example, the search selector widget may be a text box, a GUI button that triggers a popup menu for the user to select field and field values, a set of GUI buttons, or other GUI widget that is configured to receive the selection of a query. The user may use the search selector widget when the user determines that the reference records automatically determined by the matching model(s) do not match the target record. When the GUI receives the query, the GUI triggers the execution of the query and new reference records that match the query are populated in the GUI. The new reference records may be displayed with the existing reference records, may replace the reference records, may be displayed in a popup menu or otherwise displayed. Thus, the user may select a reference record that the user finds if the user determines that no match is found.

When the user selects a matching reference record or confirms a preselected matching reference record, GUI moves the match set to a different section for a different review level category (not shown). For example, GUI may move the match set to a review level category for confirmed matches. In the review level category for confirmed matches, only the selected reference record and the target record are displayed. Differences may or may not be demarcated.

Continuing with the GUI (132), the GUI may also include a dataset selection widget (232) and a prefilter widget (234). The dataset selection widget (232) is a GUI widget configured to receive a user selection of the target dataset or one or more reference datasets. The prefilter widget (234) is configured to prefilter reference records so that the match sets do not have certain reference records. The prefilter filters out reference records having field values satisfying the prefilter criteria entered by a user. In one or more embodiments, the reference records that are filtered out are not even analyzed by the matching model. In other words, the matching model uses a filtered reference dataset. In other embodiments, the filtering occurs when populating the GUI to display the match sets. In such embodiments, match sets, when displayed, do not show the filtered out reference records. By way of an example of using the prefilter widget, consider the scenario in which the user is matching animal records for different petting hardware stores. The target dataset is for a first hardware store and the reference dataset is for a second hardware store. The user knows that the first hardware store does not sell plumbing. Thus, in the prefilter widget, the user enters plumbing into field value for field identifying product category. Accordingly, when matching records, the target records are not matched to reference records for plumbing.

Figure 3:
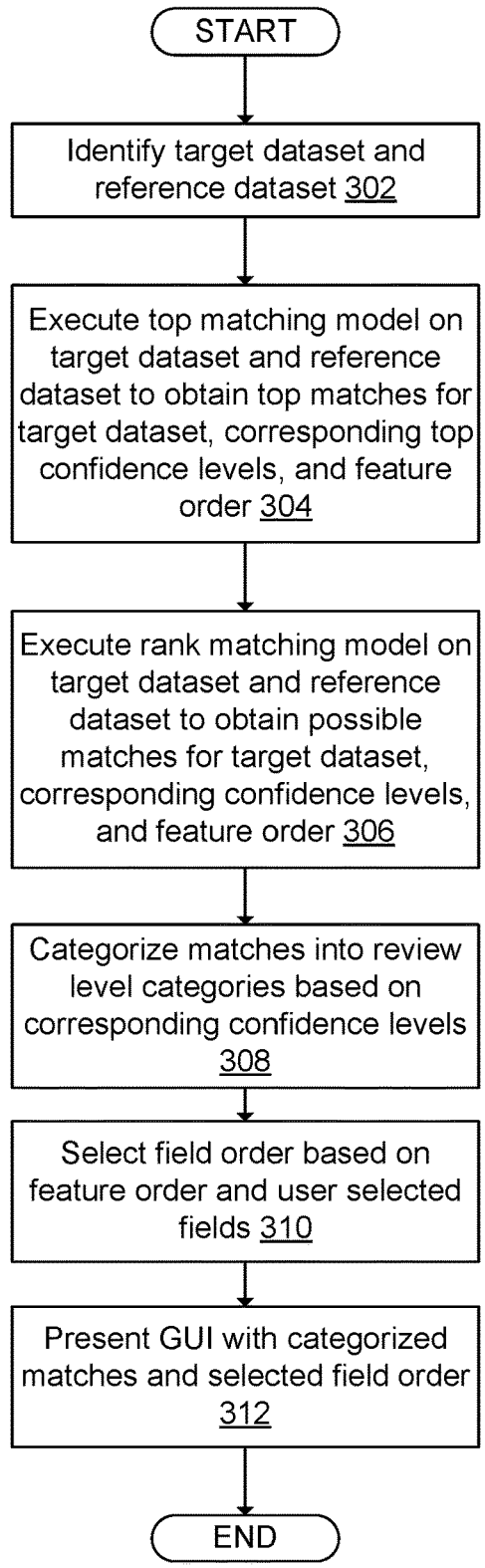
FIG. 3 is a flowchart for generating matches in accordance with one or more embodiments.
Figure 4:
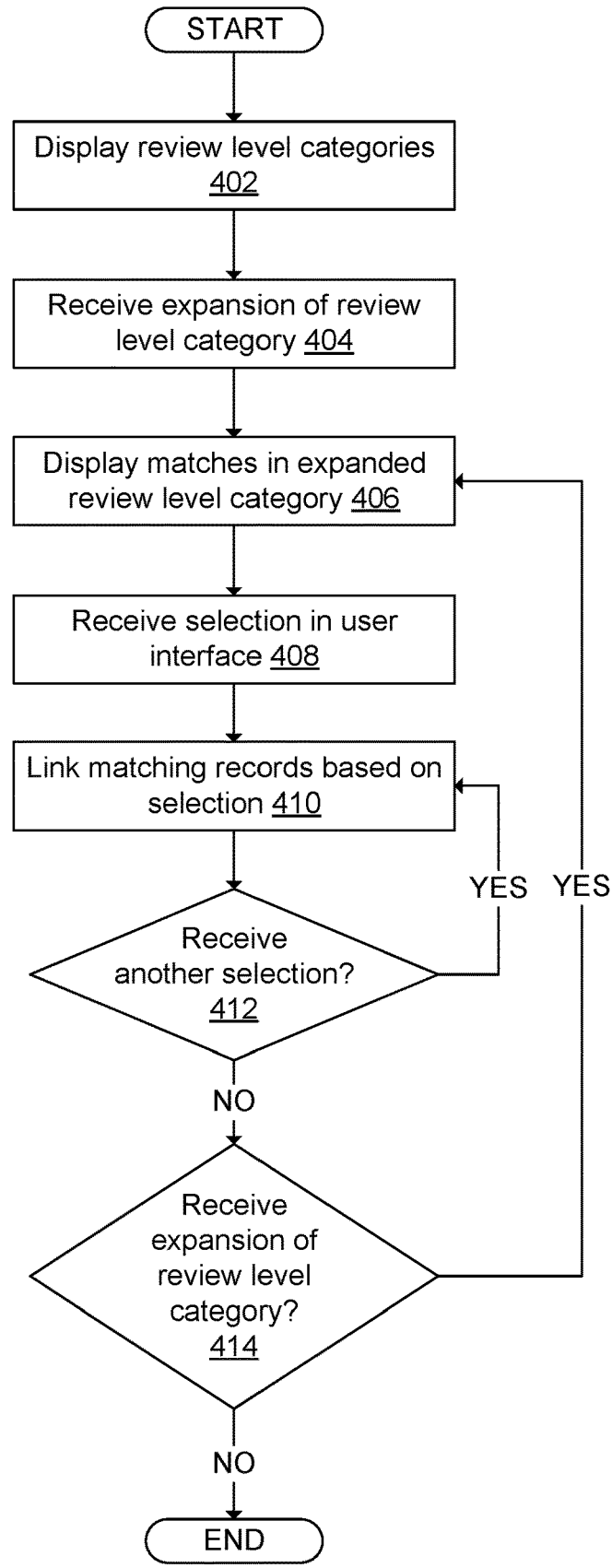
FIG. 4 is a flowchart for presenting a GUI in accordance with one or more embodiments.
Figure 5:
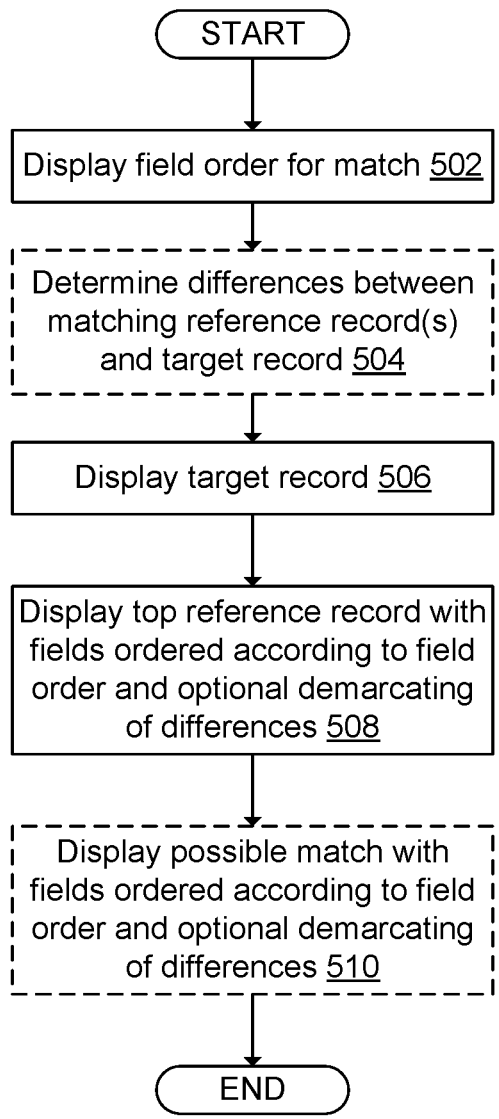
FIG. 5 is a flowchart for displaying a table portion of the GUI in accordance with one or more embodiments.

FIGS. 3-5 show flowcharts in accordance with one or more embodiments. The flowcharts may be performed by the components described above and in FIGS. 1 and 2. While the various steps in this flowchart are presented and described sequentially, at least some of the steps may be executed in different orders, may be combined or omitted, and at least some of the steps may be executed in parallel. Furthermore, the steps may be performed actively or passively.

FIG. 3 is a flowchart for generating matches in accordance with one or more embodiments. In Block 302, the target dataset and reference dataset are identified. For example, through the GUI, the user may receive a selection of the target dataset and the reference dataset. The GUI may trigger the matching by the matching models.

In Block 304, the top matching model is executed on target dataset and reference dataset to obtain top matches for target dataset, corresponding top confidence levels, and feature order. In the case in which the matching model is the Hungarian matching model, the Hungarian matching model is a model that minimizes the costs associated with performing one to one match between the target dataset and the reference dataset. To use the Hungarian matching model, the cost of the match is a function of the field level differences between the target record and a reference record, whereby the differences are weighted according to a learned set of weights. Namely, for each field, the difference between the reference record and the target record is calculated by the difference engine or a form of the difference engine in the model. A numerical value representing the amount of difference is determined. For example, for string comparison, the numerical value may be the number of characters that are different. The numerical values are mathematically combined, such as through weighted addition (i.e., summing, across multiple fields, the numeric value multiplied by the corresponding weight), to calculate the cost associated with the match. The cost is then used as input to the Hungarian matching model that performs the optimization to minimize the total cost across records. Through training, the top matching model learns the weights to apply to the fields to make more accurate predictions of the top match that the user would accept. The order of the weights are the feature order output by the Hungarian matching model.

In Block 306, the rank matching model is executed on target dataset and reference dataset to obtain possible matches for target dataset, corresponding confidence levels, and feature order. The rank matching model may be a decision tree, neural network, or other machine learning model. The rank matching model extracts features from the target records and reference records. The rank matching model uses the extracted features to match the target records to the reference records. The parameters of the rank matching model are weighted, and the weights are updated through training. Thus, the output of the rank matching model are the possible matches for a target record. In some embodiments, the rank matching model is only executed on to find possible matches for target records in which the top match has a confidence level less than a threshold. In other embodiments, the rank matching model is executed for all target records.

In Block 308, the matches are categorized into review level categories based on corresponding confidence levels. A combined confidence level is determined for each match set. The combined confidence level may be the confidence level of the top match, or a calculated value that is a mathematical or statistical combination of two or more the confidence levels in the match set. The combined confidence level is then compared to the confidence threshold(s) for the review level categories to categorize the match set into a review level category.

In Block 310, the field order is selected based on feature order and user selected fields. The user selected fields are the pinned fields that are earlier in the field order list than the remaining fields. The features in the feature order output by the top machine learning model or rank machine learning model are mapped to the corresponding fields as described above in reference to FIG. 1. The corresponding fields are then ordered in the same order as the features to which the fields are mapped to generate the field order. Any fields that are already pinned fields are omitted. The remaining fields are added to the field order list in the field order.

In Block 312, the GUI is presented with categorized matches and selected field order. Presenting the GUI displays the GUI on a display screen of the user's device. By presenting the GUI, the user may confirm the matches.

FIG. 4 is a flowchart for presenting the GUI in accordance with one or more embodiments. In particular, FIG. 4 is a flowchart for performing Block 312 of FIG. 3 in one or more embodiments.

In Block 402, the review level categories are displayed. The GUI shows the labels identifying the review level categories. The labels may be shown with GUI widgets for the user to expand or collapse the review level category. Each review level category is presented in a separate section of the user interface.

In Block 404, an expansion of review level category is received. The GUI receives a selection of a GUI widget to expand a particular review level category.

In Block 406, the matches in the expanded review level category is displayed in response to the selection. In response to the expansion request to expand the review level category in the GUI, the GUI obtains the match sets that are assigned to the expanded review level category. The match sets are displayed in the expanded section of the GUI for the review level category. Each match set, assigned to the review level category, may be displayed in an individual table in a subsection of the section for the match set. The displaying of a particular match set in one or more embodiments is described below and in FIG. 5.

Continuing with FIG. 4, in Block 408, a selection is received in the user interface. For example, the user may select a particular reference record in the match set.

If the user selects a particular reference record in the match set, then in Block 410, the matching records are linked based on the selection. Namely, in storage of the target dataset or the reference dataset, the target record identifier is stored with the matching reference record identifier to create a link between records. Other techniques may be used to link the target record to the reference record. In one or more embodiments, once the user makes a selection, the match set is moved to a different section of the user interface. In other embodiments, the match set remains until the user selects a GUI widget to confirm all selected matches in the section. Further, in some embodiments, when the matching reference record is selected, the matching reference record may be automatically removed from other reference records. The automatic removal may be to enforce exclusivity of the matches. Thus, multiple target records are not matched to the same reference record.

Although FIG. 4 shows one possible selection, if the user does not identify a match, then the user may select to add a new reference record that is a copy of the target record, search for a reference record, or indicate that no matching record exists, and no update is to be performed.

In Block 412, a determination is made whether another selection is received. The user may iterate through each of the match sets in the interface and select or confirm presented matches. Thus, if another selection is received, the flow repeats with Block 410 for the next selection.

If the user does not select another matching reference record, the flow may proceed to Block 414. In Block 414, a determination is made whether another expansion of a review level category is received. For example, the user may collapse the current review level category and repeat the process with the next review level category. If the expansion of another review level category is received, the flow repeats with Block 406.

FIG. 5 is a flowchart for displaying a table portion of the GUI in accordance with one or more embodiments. In Block 502, the field order for the match set is displayed. The field order is presented as the field order list.

In Block 504, the differences between the matching reference record(s) and the target record is optionally determined. The difference engine may calculate the differences between the field values of the target record and the corresponding field values of the top reference record and each possible reference record that is in the match set.

In Block 506, the target record is displayed. Specifically, the target record is displayed with the field values ordered according to the field order as denoted by the field order list.

In Block 508, the top reference record is displayed with the fields ordered according to the field order and optionally demarcating the differences calculated in Block 504. The fields values of the top reference record are aligned with the field values of the reference record to show the portions of the records that match and the portions that are different. The differences are demarcated to further emphasize, in the interface, the number of differences by the match.

In Block 510, optionally, the possible reference record is displayed with the fields ordered according to the field order and optionally demarcating the differences calculated in Block 504. Whether the possible reference records may be displayed as well may be dependent on the review level category assigned to the match set. For example, for the highest review level category indicating a high confidence in the top match, the possible reference records may not be displayed while the possible reference records are displayed for the lower review level categories. In some implementations, even the highest review level category has at least one possible matching reference record displayed.

The user interface simplifies the user's review of validating matches. Thus one or more embodiments combine the output generated through the machine learning with user validation, whereby the user validation has a more simplified and less cluttered review.

Figure 6:
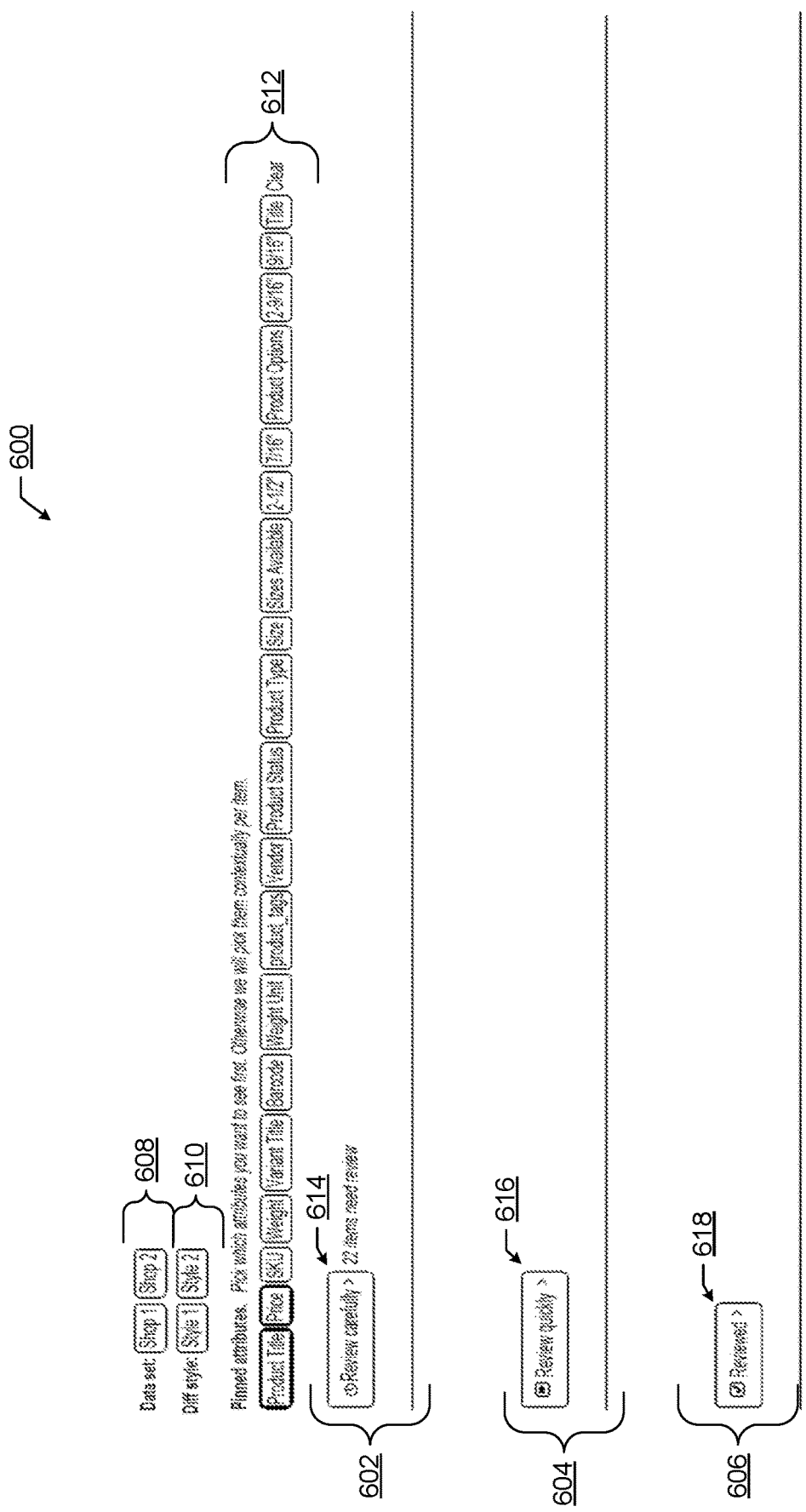
FIG. 6 is a first view of an example GUI in accordance with one or more embodiments.
Figure 7:
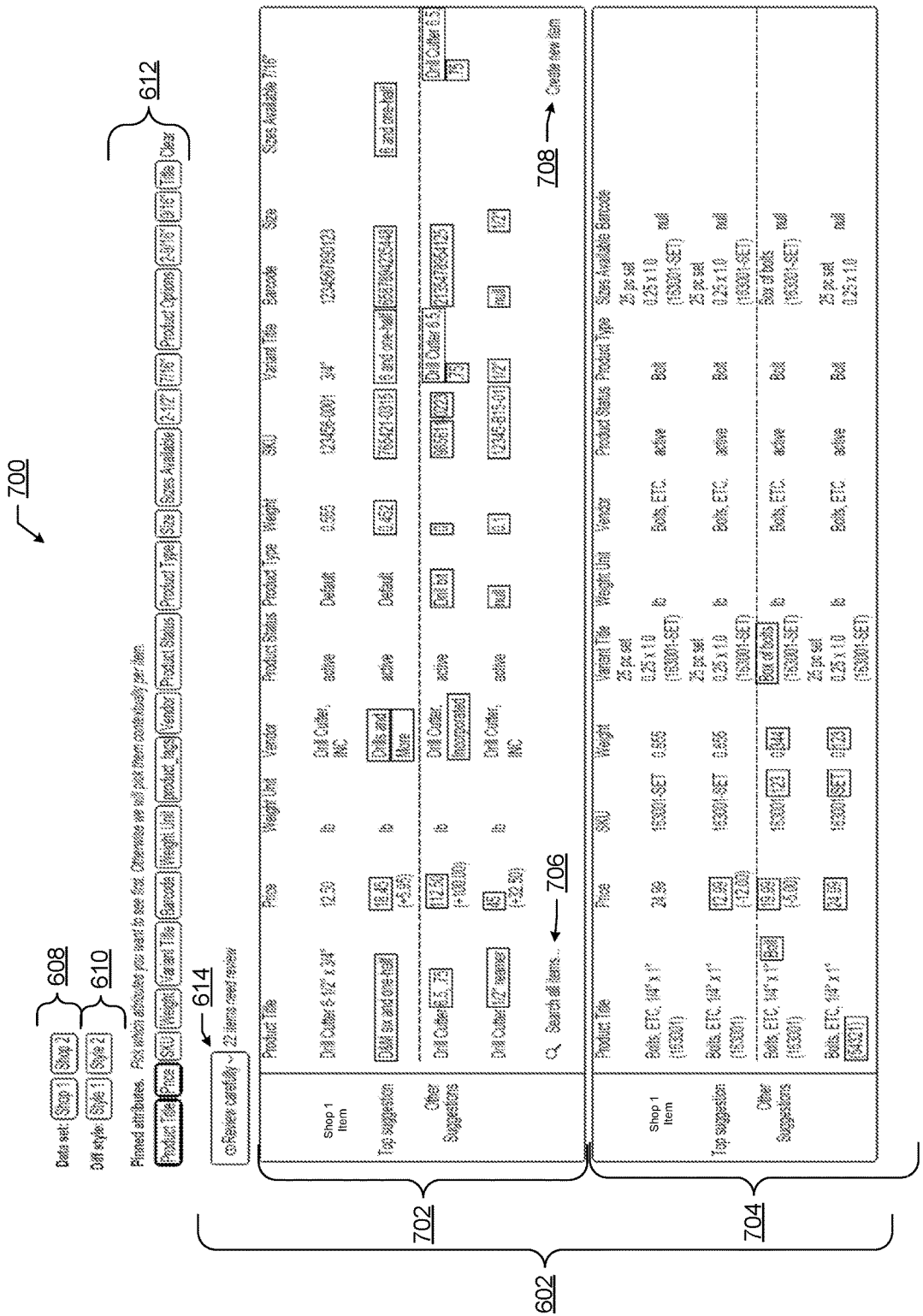
FIG. 7 is a second view of the example GUI in accordance with one or more embodiments.
Figure 8:
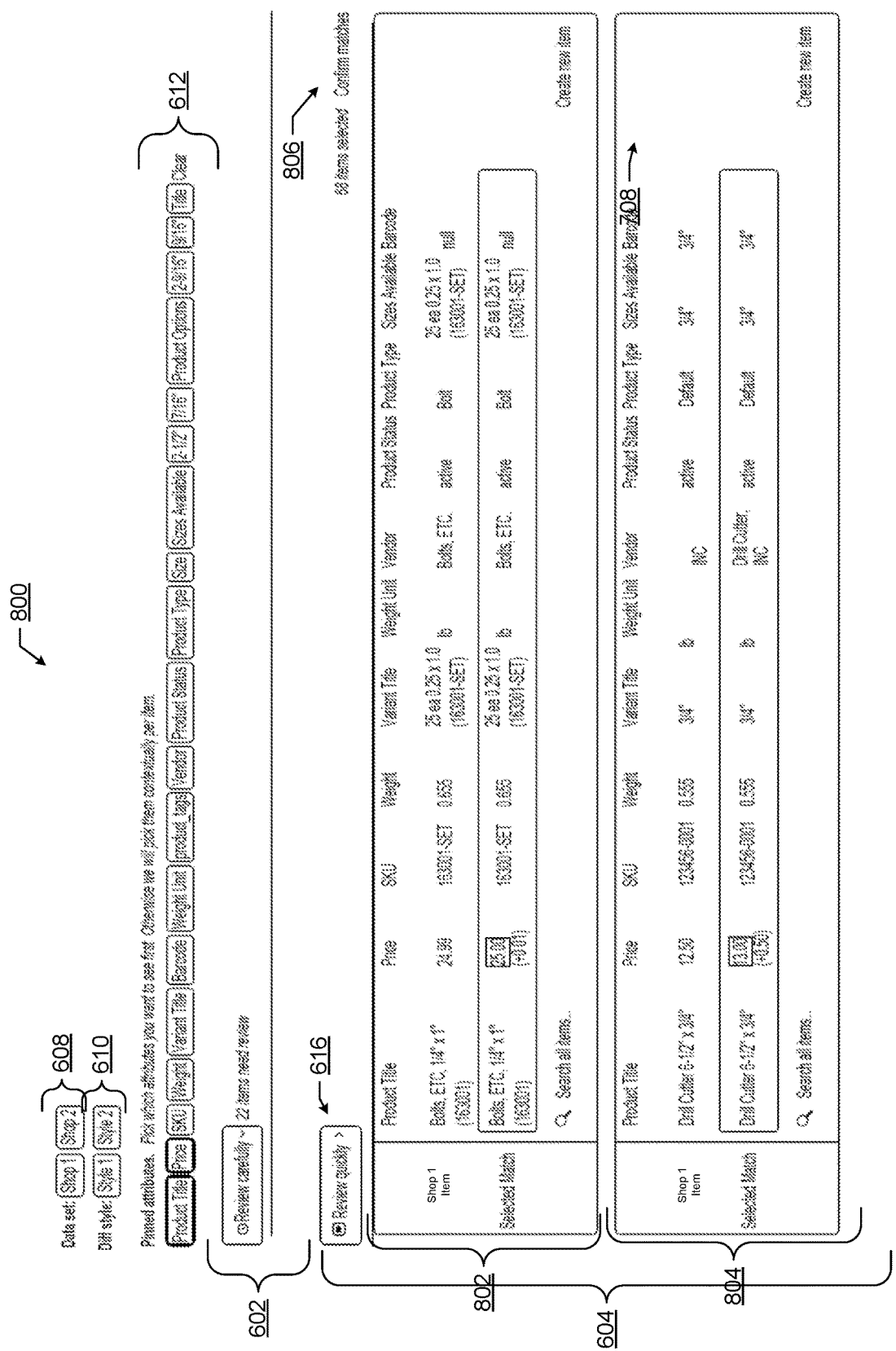
FIG. 8 is a third view of the example GUI in accordance with one or more embodiments.

FIGS. 6-8 show example views of a GUI in accordance with one or more embodiments. In the example, consider the scenario in which the user is the owner of a home improvement hardware company that sells hardware on various electronic commerce platforms. After selling on multiple platforms for several years, the owner anticipates that the records for the different platforms are inconsistent. Namely, the same item is inconsistently recorded and listed on one platform as compared to another platform causing problems in the owner managing their inventory. However, because the company sells hundreds of items, the owner cannot manually compare the records. Thus, the owner uses the matching tool. The matching tool may be part of an inventory management software application, or a service referenced by the inventory management software application.

FIG. 6 shows a first view (600) of the GUI with the sections (i.e., review carefully section (602), review quickly section (604), and reviewed section (606)) corresponding to the review level categories collapsed. When the owner accesses the platform, the company may see the view (600) shown in FIG. 6. The owner selects, using the dataset selection widget (608), the two electronic commerce platforms for which the company wants to compare records. The first electronic commerce platform is "Shop 1", and the second electronic commerce platform is "Shop 2," which are both selectable via GUI buttons.

The owner may also select difference styles using a difference style widget (610). The difference styles is a style set for the GUI to display differences between field values. For example, one style may be modification of font color or highlighting, and another style may be with cross throughs and underlying. Further, the owner may use the field pin widget (612) to pin fields in the user interface. The field pin widget lists the possible fields that may be pinned in the ordered field list. In the example, the owner selects to pin the product title and the price because the owner believes that the combination of the two is the best way for the company to determine if the records match.

In response to the selections, the matching tool executes and may update the view. For example, as shown in FIG. 6, the matching tool updates the GUI to show that the user only has 22 match sets to review carefully (602). By separating our match sets into different review level categories and collapsing the sections, the company is not immediately overwhelmed. Further, by showing the number of match sets for the owner to review, the owner can anticipate the timing requirements to perform the review. Each section includes an expansion widget (i.e., review carefully expansion widget (614), review quickly expansion widget (616), and reviewed expansion widget (618)) to expand the section.

Next, consider the scenario in which the owner selects to expand the review carefully section (602) using the review carefully expansion widget (614).

Turning to FIG. 7 shows a view (700) of the GUI when the owner expands the review carefully expansion widget.

As shown, each match set is shown in a separate subsection (e.g., subsection 1 (702), subsection 2 (704)) of the GUI. As shown, the subsection has an individual table for each target record in the review level category. The individual table has a row for the target record (i.e., the shop 1 item), a row for the top reference record, and one or more rows for the possible reference record. The top reference record is delineated by a horizontal dashed line from the rows of the possible reference records. The field values of the reference records are shown with differences marked. For the purposes of the application, the differences are shown with boxes around the portions of the field values that are different.

In the example, for the first match set, the target record and the reference records are for reamers sold on the two platforms. The reamers are listed as coming from vendors, "Drill Cutter, Inc" and "Drills and More (D&M)". The matching model determines that the records may be for the exact same reamer. For the second match set, the target record and the reference records are for bolts from vendor "Bolts, etc." sold on the two platforms. The matching model determines that the records may be for the exact same bolts. For generating the first match set as compared to generating the second match set, the feature order and correspondingly the field order are different from each other. The product title field and the price field are pinned and, as such, are the initial fields listed. However, the remaining fields may be in different orders has shown in FIG. 7. By highlighting the differences and showing field values in order of importance the owner may more quickly review the records and select a match. If the owner determines that a match is not found, the owner may select to search all items using search selector widget (706) or create a new record for the target item on the Shop 2 platform using the create record widget (708).

Although not shown in FIG. 7, scrolling down in the interface may allow the user to view the remaining match sets in the review carefully category. Further, the owner may review the match sets in the next review level category. The owner may collapse the review carefully category.

FIG. 8 shows a view (800) of the GUI when the user collapses the review carefully category and expands the review quickly category (604) using review quickly expansion widget (616). In the review quickly category (604), the match sets are shown in different subsections (802, 804). Further, the top matches are preselected as selected matches (as shown with boxes around the top matches). If the owner disagrees with the preselected top match as being a match, the owner may select to search all items using search selector widget or create a new record for the target item on the Shop 2 platform using the create record widget as shown in the subsection. After reviewing the match sets, the owner may select the "confirm matches" button (806) to confirm all matches in the review quickly category. As shown in FIG. 8, the review quickly category still marks the differences. However, because the differences are minor and the match sets are shown in a separate section than other review level categories, the owner may quickly review the match sets and make a fast determination. By not intermixing match sets in different review level categories, the overall review is faster. Further, by having a decluttered GUI, the user is able to be focused on the more pertinent aspects of the review.

Figure 9A:
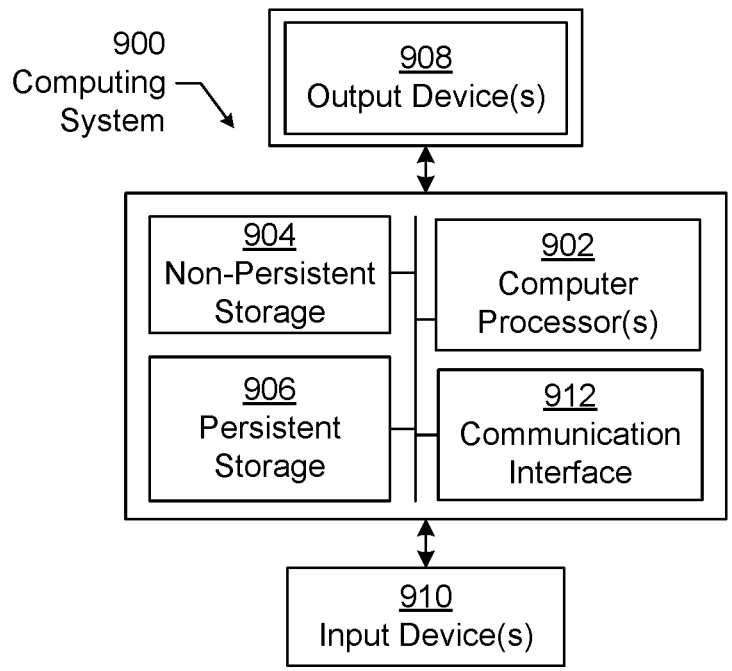
FIGS. 9A and 9B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processors (902), non-persistent storage (904), persistent storage (906), a communication interface (908) (e.g., Bluetooth interface, infrared interface, network interface, optical interface, etc.), and numerous other elements and functionalities that implement the features and elements of the disclosure. The computer processor(s) (902) may be an integrated circuit for processing instructions. The computer processor(s) may be one or more cores or micro-cores of a processor. The computer processor(s) (902) includes one or more processors. The one or more processors may include a central processing unit (CPU), a graphics processing unit (GPU), a tensor processing unit (TPU), combinations thereof, etc.

The input devices (910) may include a touchscreen, keyboard, mouse, microphone, touchpad, electronic pen, or any other type of input device. The input devices (910) may receive inputs from a user that are responsive to data and messages presented by the output devices (912). The inputs may include text input, audio input, video input, etc., which may be processed and transmitted by the computing system (900) in accordance with the disclosure. The communication interface (908) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the output devices (912) may include a display device, a printer, external storage, or any other output device. One or more of the output devices may be the same or different from the input device(s). The input and output device(s) may be locally or remotely connected to the computer processor(s) (902). Many different types of computing systems exist, and the aforementioned input and output device(s) may take other forms. The output devices (912) may display data and messages that are transmitted and received by the computing system (900). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 9B:
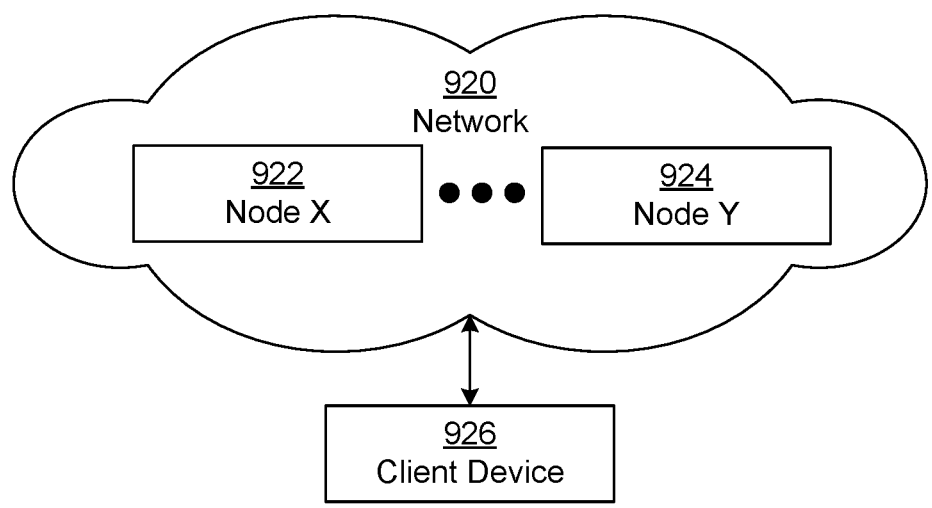

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

The nodes (e.g., node X (922), node Y (924)) in the network (920) may be configured to provide services for a client device (926), including receiving requests and transmitting responses to the client device (926). For example, the nodes may be part of a cloud computing system. The client device (926) may be a computing system, such as the computing system shown in FIG. 9A. Further, the client device (926) may include and/or perform all or a portion of one or more embodiments.

The computing system of FIG. 9A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   obtaining a plurality of matches between a plurality of target records in a target dataset and a plurality of reference records in a reference dataset, each match of the plurality of matches comprising a corresponding confidence level of the match;
   categorizing the plurality of target records into a plurality of review level categories according to the corresponding confidence level;
   ordering, to create a field order, a plurality of fields according to a feature order, the feature order corresponding to a prominence of each feature of a target record of the plurality of target records in determining that the at least one matching reference record matches the target record, wherein the prominence of each feature of the target record of the plurality of target records is determined by a machine learning model; and
   presenting a graphical user interface (GUI) with the plurality of target records organized according to the plurality of review level categories, wherein the GUI comprises:
      a first section for a first review level category of the plurality of review level categories, wherein the first section shows a first subset of the plurality of target records assigned to the first review level category, the first subset comprising target records related, in the GUI, to at least one matching reference record of the plurality of reference records as defined by the plurality of matches as a table comprising a plurality of columns corresponding to the plurality of fields, wherein at least a portion of the plurality of columns are ordered according to the field order, and a plurality of rows comprising a first row of first field values, of the plurality of fields, of the target record, and a second row of second field values, of the plurality of fields, of a reference record of the at least one matching reference record, and
      a second section for a second review level category of the plurality of review level categories, wherein the second section is displayed separately from the first section, wherein the second section shows a second subset of the plurality of target records assigned to the second review level category, the second subset comprising target records related, in the GUI, to at least one matching reference record of the plurality of reference records as defined by the plurality of matches.

2. The method of claim 1,
   wherein the second field values are shown with differences from the first field values demarcated.

3. The method of claim 1,
   wherein an initial portion of plurality of columns are user selected and a remaining portion of the plurality of columns are ordered according to the field order.

4. The method of claim 1,
   wherein the field order is a first field order for a first target record in the first subset, and the table is a first table; and
   wherein the method further comprises ordering, to create a second field order, the plurality of fields according a second feature order, the second feature order corresponding to a prominence of each feature of a second target record in the first subset in determining that the at least one matching reference record of the second target record matches the second target record,
wherein the first section of the GUI further shows:
a second table for the second target record with a second plurality of columns corresponding to the plurality of fields, wherein the second plurality of columns are ordered according to the second field order.

5. The method of claim 1, wherein:
the first section comprises a user interface label to review quickly based on the first review level category for the corresponding confidence level being greater than a confidence threshold, and
the second section comprises a user interface label to review carefully based on the second review level category for the corresponding confidence level being less than the confidence threshold.

6. The method of claim 1, wherein:
the first section shows the first subset of the plurality of target records assigned to the first review level category, the first subset comprising target records preassigned to a single matching reference record of the plurality of reference records as defined by the plurality of matches, and
the second section shows the second subset of the plurality of target records assigned to the second review level category, the second subset comprising target records related to at least two matching reference records of the plurality of reference records as defined by the plurality of matches and order according to the corresponding confidence level.

7. The method of claim 1, wherein the at least one matching reference record in the first subset comprises a difference calculated between an amount associated with the at least one matching reference record and corresponding amounts associated with the target records in the first subset.

8. The method of claim 1, further comprising:
executing a top matching machine learning model on the target dataset and the reference dataset to obtain a plurality of top matches for the target dataset, each match of the plurality of top matches comprising a corresponding top match confidence level of the match; and
executing a rank matching machine learning model on the target dataset and the reference dataset to obtain a plurality of possible matches for the target dataset, each match of the plurality of possible matches comprising a corresponding possible match confidence level of the match,
wherein the plurality of matches comprising the plurality of top matches and the plurality of possible matches, wherein the corresponding confidence level is at least one of the corresponding top match confidence level and the corresponding possible match confidence level.

9. The method of claim 1, further comprising:
receiving a selection of a matching reference record for a target record in the second subset;
linking the matching reference record to the target record in storage; and
removing the matching reference record from matching any remaining target records in the plurality of target records responsive to the selection.

10. A non-transitory computer readable medium comprising a computer readable program code for a graphical user interface comprising:

a plurality of target records organized according to a plurality of review level categories, the plurality of target records in a target dataset matched by a plurality of matches to a plurality of reference records in a reference dataset, each match of the plurality of matches comprising a corresponding confidence level of the match, wherein the plurality of target records are categorized into the plurality of review level categories according to the corresponding confidence level,
wherein the graphical user interface (GUI) comprises:
a first section for a first review level category of the plurality of review level categories, wherein the first section shows a first subset of the plurality of target records assigned to the first review level category, the first subset comprising target records related, in the GUI, to at least one matching reference record of the plurality of reference records as defined by the plurality of matches as
a table comprising:
a plurality of columns corresponding to a plurality of fields, wherein the plurality of columns are ordered according to a field order, wherein at least a portion of the plurality of fields are ordered according to a feature order to create the field order, the feature order corresponding to a prominence of each feature of a target record of the plurality of target records in determining that the at least one matching reference record matches the target record, wherein the prominence of each feature is determined by a machine learning model, and
a plurality of rows comprising:
a first row of first field values, of the plurality of fields, of the target record, and
a second row of second field values, of the plurality of fields, of a reference record of the at least one matching reference record, and
a second section for a second review level category of the plurality of review level categories, wherein the second section is displayed separately from the first section, wherein the second section shows a second subset of the plurality of target records assigned to the second review level category, the second subset comprising target records related, in the GUI, to at least one matching reference record of the plurality of reference records as defined by the plurality of matches.

11. The non-transitory computer readable medium of claim 10,
wherein the second field values are shown with differences from the first field values notated.

12. The non-transitory computer readable medium of claim 10,
wherein an initial portion of plurality of columns are user selected and a remaining portion of the plurality of columns are ordered according to the field order.

13. The non-transitory computer readable medium of claim 10,
wherein the table is a first table for a first target record and the first section of the GUI shows a second table for a second target record, the first table comprising a first column order that is different to a second column order of the second table.

14. The non-transitory computer readable medium of claim 10, wherein:
the first section comprises a user interface comment to review quickly based on the first review level category for the corresponding confidence level being greater than a confidence threshold, and the second section comprises a user interface comment to review carefully based on the second review level category for the corresponding confidence level being less than the confidence threshold.

15. The non-transitory computer readable medium of claim 10, wherein:

the first section shows the first subset of the plurality of target records assigned to the first review level category, the first subset comprising target records preassigned to a single matching reference record of the plurality of reference records as defined by the plurality of matches, and the second section shows the second subset of the plurality of target records assigned to the second review level category, the second subset comprising target records related to at least two matching reference records of the plurality of reference records as defined by the plurality of matches and order according to the corresponding confidence level.

16. The non-transitory computer readable medium of claim 10, wherein the at least one matching reference record in the first subset comprises a difference calculated between an amount associated with the at least one matching reference record and corresponding amounts associated with the target records in the first subset.

17. A method comprising:

executing a top matching machine learning model on a target dataset and a reference dataset to obtain a plurality of top matches for the target dataset, each match of the plurality of top matches comprising a corresponding top match confidence level of the match;

populating a first section of a graphical user interface with a first subset of the plurality of top matches that have the corresponding top match confidence level greater than a confidence threshold;

executing a rank matching machine learning model on the target dataset and the reference dataset to obtain a plurality of possible matches for the target dataset, each match of the plurality of possible matches comprising a corresponding possible match confidence level of the match; and populating a second section of the graphical user interface with a second subset of the plurality of possible matches when a target record has the corresponding possible match confidence level less than the confidence threshold, wherein the second section is presented separate from the first section in the graphical user interface.

18. The method of claim 17, further comprising:

receiving a selection of a matching reference record for the target record in the second subset;

linking the matching reference record to the target record in storage; and removing the matching reference record from matching any remaining target records in a plurality of target records responsive to the selection.

* * * * *